United States Patent [19]

Bauer et al.

[11] Patent Number: 4,657,754

[45] Date of Patent: Apr. 14, 1987

[54] ALUMINUM OXIDE POWDERS AND PROCESS

[75] Inventors: Ralph Bauer, Niagara Falls, Canada; Arup K. Khaund, Worcester, Mass.; Ronald W. Trischuk, Niagara Falls, Canada; Joseph Similia, Leominster, Mass.

[73] Assignee: Norton Company, Worcester, Mass.

[21] Appl. No.: 800,494

[22] Filed: Nov. 21, 1985

[51] Int. Cl.$^4$ .............................................. C01F 7/02
[52] U.S. Cl. .................................. 423/625; 156/603; 264/125; 264/332; 501/127
[58] Field of Search .................. 423/625; 501/127; 264/125, 332; 156/603

[56] References Cited

U.S. PATENT DOCUMENTS

| | | | |
|---|---|---|---|
| 4,154,812 | 5/1979 | Sanchez et al. | 423/625 |
| 4,179,408 | 12/1979 | Sanchez et al. | 423/628 |
| 4,314,827 | 2/1982 | Leitheiser et al. | 51/298 |
| 4,371,513 | 2/1983 | Sanchez et al. | 423/625 |
| 4,374,119 | 2/1983 | Schepers et al. | 423/625 |
| 4,487,756 | 12/1984 | Mizrah et al. | 423/625 |
| 4,555,394 | 11/1985 | Asaoka et al. | 423/628 |
| 4,565,600 | 1/1986 | Ricard | 156/608 |

FOREIGN PATENT DOCUMENTS 2099012 12/1982 United Kingdom .

OTHER PUBLICATIONS

Pages 156–167 from book entitled Ultrafine-Grain Ceramics, editors: John J. Burke, Norman L. Reed, and Volker Weiss, Syracuse University Press, Copyright 1970.
Journal of the American Ceramic Society, 68 [9], C-238-C-240 (1985).
Journal of the American Ceramic Society, 68 [9], 500–505 (1985).

Primary Examiner—Stephen J. Lechert, Jr.
Attorney, Agent, or Firm—Rufus M. Franklin

[57] ABSTRACT

Fine alumina powders for making alumina bodies are produced by seeding of a non-alpha alumina with sub-micron alpha alumina particles, firing, and crushing and milling the fired product to a fine powder. The powder so produced may be formed by conventional techniques such as pressing, granulating, slip casting, tape casting, and extrusion, and sintered to produce the desired fired product.

12 Claims, No Drawings

ALUMINUM OXIDE POWDERS AND PROCESS

BACKGROUND OF THE INVENTION

Most current commercial methods for producing anhydrous alumina powders involve comminution steps whereby the initial powder particles or agglomerates are broken down to a desired size range.

The most commonly desired form of alumina for ceramic article fabrication is a very fine powder. The crystals of alpha alumina are extremely hard and durable and hence quite difficult to mill to fine sizes; the process requires long milling times and is energy intensive. It is possible to mill hydrated aluminas (such as are produced in the Bayer process) more easily than the alpha form, however, sodium contamination is generally a problem and agglomeration arises when the hydrate is calcined to alpha and further milling is required. A major reason that this agglomeration occurs is that >1100° C. is required to convert the hydrated form to alpha; at this temperature partial sintering and grain growth occur.

A key feature in the millability of alpha aluminas is the size of the ultimate crystals since sintered bonds are weaker than atomic crystalline bonds. It follows then that in milling alpha powders, it is desirable to comminute the agglomerated systems rather than ultimate crystals. Clearly then, the ultimate crystal size should be equal to or less than the desired milled particle size to minimize time and energy requirements for the size reduction process.

One of the major problems with current comminution technology of alpha aluminas is this ultimate crystal size factor. Bayer process derived alpha alumina is produced from the hydrated form and is therefore necessarily calcined at 1100° C. or more. It is difficult to obtain submicron ultimate crystals in this process, particularly if sodium removal at high temperatures is also carried out. In order to manufacture a submicron alpha powder, the ultimate crystals themselves must be ground to a finer size, a difficult task.

According to the present invention we have developed techniques for producing extremely fine (<0.5 micron) ultimate crystals of alpha alumina; such aluminas have the desireable properties of being relatively easy to reduce in size to their ultimate crystal size and, being highly reactive, sinter at lower than conventional temperatures by virtue of their small particle size (high surface energy).

It is, accordingly, an object of the present invention to produce alumina (preferably the alpha form) with ultimate crystal size less than one micron (preferably less than 0.5 micron) which can be deagglomerated, as by milling, at much less than conventional milling times and energies and will be much more thermally reactive (i.e. easily sinterable) than conventional powders, and to produce fired monolithic bodies therefrom.

DESCRIPTION OF THE INVENTION

In published E.P.O. application No. 0152768 (Aug. 28, 1985) has been described the seeding of an alumina gel with very fine (<0.5 micron) alpha alumina to produce a fine grained (<1 micron) ceramic which can be sintered to >95% density at <1400° C. in 5 minutes.

Differential thermal analysis data has shown that the seeding lowers the temperature of transition to alpha alumina by about 100° C. This fact, coupled with the further grain size reduction encouraged by seeds themselves, provides a means to produce fine alpha at lower than conventional temperatures.

The preferred method for production is to prepare a sol or gel of pseudoboehmite (microcrystalline boehmite) and to mix in the seeding agent. In general, the finer the seeds are, the finer the ultimate crystals will be and hence the quality of seeds used is critical in determining the microstructure of the product alumina.

One method of producing seeds is to simply allow alpha alumina grinding media to wear against themselves in a vibratory mill and hence produce fines (seeds). We have found such seeds extremely useful when added in about 1% by weight (weight of seeds in finished product alumina). The relationship of grain size to seed size has been derived approximately as 3.6 times the seed size (when a spherical seed and a cubic grain shape are assumed) for a 1% addition of seed.

It is obvious from the above relation that to obtain submicron grain sizes, seeds less than 0.3 micron in size are required. In a distribution of seeds, the finest fraction does the major portion of promoting nucleation to the alpha phase.

Once the seeded gel has been prepared it is simply dried and then may be calcined to alpha. After conversion, the alpha is milled to a desired size range.

The preferred method for conversion to alpha is to use the lowest temperature which is convenient to obtain the desired ratio of alpha/gamma (or other intermediate anhydrous form). Generally 95% or greater alpha is desired but in some applications the gamma or other anhydrous form is useful. By utilizing the lowest temperatures, the degree of sintering and densification is minimized and comminution is made much easier. For example, if the dried gel is calcined at 1350° C. 90% theoretical density is approached and milling becomes difficult even though ultimate crystal size is fine, whereas at <1250° C. (depending on seed qualities) milling is relatively easy.

The milled product may be utilized as is in the size range produced or further classified to narrow the size distribution. When milling is carried out to reduce essentially all agglomerates, an essentially monosized powder is produced. The milling may be carried out dry or wet. If desired, various organic solvents may be used instead of water. Bimodal powders may be produced by mixing a coarser monosized powder of say 0.6 microns with a finer powder of say 0.07 microns in suitable proportions. Monosized powders are useful for making dense smooth surfaces, for example, for electronic substrates and for high green density and for very fine controlled pore size membranes or tubes for microfiltration.

The slurries after milling/classification may be used directly for tape casting applications, for slip casting, or may be dried and processed as dry powders as in isostatic pressing, hot pressing, hot isostatic pressing, and the like.

EXAMPLE I

This illustrates the conversion of the seeded gel to alpha at low temperatures.

An alumina gel was produced by stirring 200 grams of Condea PURAL SB alumina monohydrate into 1700 ml of distilled water to which 100 ml of 14 wt % nitric acid had been added. The sample was split in half and to one half was added "milled water" so that the alpha alumina content of the seeds relative to the alpha alumina content of the gel was 1% by weight.

The samples were placed in a drying oven at 90° C. for 4 days and then crushed with a rolling pin into powder of −54 mesh. Samples were then placed into a preheated muffle furnace at 900° C. plus or minus 10° (static air) and aliquots removed periodically and examined for alpha alumina content by X-ray diffraction. The following results were obtained:

| Heating Time | % of alpha Al2O3 (±3%) | |
| (hrs. @ 900° C.) | Seeded | Unseeded |
| --- | --- | --- |
| 0 | ND* | ND |
| 0.67 | 4 | ND |
| 19 | 82 | ND |
| 25 | 89 | ND |
| 43 | 89 | ND |
| 67 | 93 | 3 |
| 138 | 96 | 4 |
| 170 | — | 4 |

* - Not Determined

Clearly the act of seeding allows formation of alpha to proceed smoothly at 900° C. whereas the unseeded gel converts only extremely slowly.

The X-ray diffraction patterns also exhibited line broadening in the alpha cases, which calculated to ultimate crystal size of less than 0.1 micron.

Studies at other temperatures and DTA investigations led to an empirical formula for the rate of conversion of the 1% seeded gel, using seed made by vibratory milling, in water, of alumina media:

$$\text{Ln (gamma)} = -6.67t \times 10^{12} \times e \exp\left[\frac{42275}{T}\right]$$

where
Ln is the natural logarithm
(gamma) is the fraction of "gamma" remaining
e is the base of natural logarithms
T is the absolute temperature (°K.)
t is the time in minutes Thus to produce 95% alpha at 1000° C. requires 2 hours and 1100° C. requires 11 minutes, for 1% of seed having an estimated size of about 0.02 microns. For minimum size of ultimate crystals and for maximum ease in milling minimum sintering to get the desired results should be used.

EXAMPLE II

This example illustrates ease of milling of the seeded calcined gel.

Five 80 lb. lots of dried gel were crushed to finer than 132 microns. The gel was prepared from Condea PURAL NG with water and nitric acid similar to example I. The seeding level in this case was 0.6% wt %. Each 80 pound lot was processed through an electrically heated rotary kiln at various temperatures for about 5 minutes. The results are tabulated as follows:

| Firing Temperature | Approximate % alpha alumina by X-ray deffraction |
| --- | --- |
| 1050° C. | 9 |
| 1100 | 26 |
| 1150 | 29 |
| 1200 | 100 |
| 1250 | 100 |

The two samples which contained 100% alpha were characterized further:

| Firing Temp. (°C.) | Ultimate Crystal size* | Chemistry | |
| --- | --- | --- | --- |
| 1200 | .07 microns | Na2O | .01 |
| 1250 | 0.1 microns | MgO | .02 |
| | | SiO2 | .06 |
| | | CaO | .02 |
| | | TiO2 | .23 |
| | | Fe2O3 | .04 |

*by SEM

The impurities, except for most of the titania, were from the seed material produced from commercial grinding media. Higher purity seed can be achieved by employing very high purity grinding media, such as high purity fused alumina, or dense sintered bodies of the present invention.

These powders were wet vibratory milled and the empirical observation was that they were much more friable and took only a fraction of the time to mill than conventional alpha powders took.

The process described herein produces an alumina powder which is more easily millable than conventional powders and which has an ultimate alpha crystal size of less than one micron. This fine ultimate crystal size makes the powder more reactive (i.e. easily sinterable) and is an important factor in providing smoother surface finishes in ceramic articles/substrates. The product is thus of superior quality and is made more economically than current commercial practice. ceramic articles/substrates. The product is thus of superior quality and is made more economically than current commercially practised.

Since the seeding process is dependent on the actual number of seeding sites, the amount of seed added should ideally be specified in terms of numbers rather than weight %. Such numbers may be calculated if the particle size distribution is accurately known. It can be calculated that for submicron product microstructure, seeding numbers on the order of greater than $10^{12}$ per cubic centimeter are required. However, often it is impractical to obtain an accurate particle size distribution of the seeds and the empirical approach of seeding by weight % addition of a specific batch of seed material to obtain the desired submicron microstructure may be employed. For example, a specific lot of seed material generated by attrition of grinding media, observed approximately as having most particles less than 0.05 microns, is effective in producing submicron grain when added as 0.1 weight % or more.

If the seed size is dimminished, lesser weights can be used. The optimum effectiveness of seeds would be observed when the seeds are at their smallest possible physical size, i.e. at the critical nucleation size. This size is currently unknown but is certainly less than 0.02 microns.

It is recognized that the product microstructure may be controlled as described above and approximate values may be obtained by using the following approximate equations.

$$N = 6 w G/\pi d^3[(100-w)S + wG]$$

Grain diameter = 1/cube root of N
Where:
N = no. of seeds per cubic centimeter
w = weight % of seeds
G = grain density, grams/cc
S = seed density, grams/cc
and d = diameter of seeds in centimeters For all practical purposes G and S are equal to 4.0, the theoretical density of alpha alumina.

Many assumptions are used in the derivation of the above equation and, as such, they are merely meant to provide general guide lines and recourse to emperical tests must generally be carried out to verify structure. It is to be noted also that the grain size equations given represent minimum grain sizes, i.e. assume no growth after 100% conversion to alpha alumina. If it is preferred to have larger grains, a combination of the seed size, seed amount, time, and temperature control can be varied to generate desired structures.

Polycrystalline granular or pelletized material may be made from the powders of this invention, in addition to shaped articles made by tape casting, molding, pressing, extruding, and slip casting. Granular products have utility as abrasives, proppants, milling media, and refractories, in addition to use as fillers in fine ceramics.

The alumina of the present invention may be used as an ingredient in mixes containing other ceramic materials such as zirconia or stabilized zirconia, $Si_3N_4$, and AlN, etc.

EXAMPLE III

A smooth alpha alumina electronic substrate with very fine microstructure was produced by the following procedure. A seeded dried gel crushed to pass through a sieve with 132 micron sized openings was fired at 1200° C. for five minutes, containing about 1% of seed produced by vibratory milling of a mass of $\frac{1}{2} \times \frac{1}{2}$ inch cylindrical alpha alumina grinding media in water for several hours.

The fired powder was then milled in isopropyl alcohol (50 to 60% solids) with glycerol trioleate (1%) to break the agglomerates. The powder was then dried and mixed with a carrier, defloculant, and binder:

| | | |
|---|---|---|
| powder | 50% | |
| xylene | 21.82% | |
| isopropyl alcohol | 14.41% | |
| defloculent | 0.22% | (menhaden fish oil) |
| polyethylene glycol | 4.73% | plasticizer/binder |
| polyvinyl butvar | 2.97% | |
| butyl benzyl phthalate | 5.83% | |

The mix was then homogenized in a Sweco vibratory mill for 20 to 24 hours. The resultant slurry was then de-aired for one hour and cast into a green sheet using a doctor blade setting between 0.035 to 0.050 inches. The green tape was dried at about 70° F. plus or minus 4° C. in a relative humidity held at 45 to 55%. Squares, 2 inches by 2 inches, were punched out using a steel die. The squares were heated at 600° C. to drive off the volatiles, and then sintered at 1370° to 1450° C. The resulting substrate squares were $1\frac{5}{8} \times 1\frac{5}{8}$ inches in size, had a density of at least 3.65 g/cc and were water impervious. They had a surface finish of 2 to 4 microinches. Scanning electron microscope examination revealed a very uniform microstructure at 20000× magnification. The particles were uniformly sized at about 0.2 to 0.3 microns, were equiaxed, and at that magnification, generally spherical and softly rounded in shape when observed on a broken surface.

What is claimed is:

1. A method of preparing an alumina powder containing alpha alumina crystals having a size below 1 micron comprising seeding an alumina gel precursor of alpha alumina with submicron alpha alumina seed particles, sintering the seeded precursor at 900° to 1350° C. for a time sufficient to convert at least a portion of the non-alpha alumina to alpha alumina, and crushing the sintered product to a powder having a particle size of less than 1 micron.

2. A method as in claim 1 in which the seed particles have a size of 0.1 micron or less.

3. A method as in claim 1 in which the seed particles are finer than 0.1 micron and the sintering is stopped when the growing alpha alumina crystals have reached a size of no greater than 0.1 microns.

4. An alpha alumina powder consisting of a mixture of equiaxed single crystals of seeded alpha alumina having a size below 1 micron and sintered porous agglomerates of said single crystals.

5. A material as in claim 4 in which the agglomerates are all finer than 1 micron.

6. A milled powder consisting of seeded alpha alumina particles finer than 1 micron.

7. A milled powder made according to the process of claim 1.

8. A method of making a monolithic polycrystalline body of alpha alumina comprising forming the powder of claim 6 into a body and sintering it at a temperature above 1100° C. for a time sufficient to bond the crystals.

9. A method of making a monolithic polycrystalline body comprising forming the powder of claim 1 into a body and sintering to achieve bonding.

10. A ceramic body made made according to the method of claim 9.

11. A ceramic body made with the powder of claim 6.

12. An alumina substrate made from the powder of claim 1 having a surface roughness as fired of 4 microinches or finer, a density of at least 3.65, and being made by tape casting a plasticized mix of the seeded powder; drying and firing the casting at 1450° C. or less.

* * * * *